US012476477B2

(12) United States Patent
Yin

(10) Patent No.: US 12,476,477 B2
(45) Date of Patent: Nov. 18, 2025

(54) ELECTRONIC DEVICE

(71) Applicant: VIVO MOBILE COMMUNICATION CO., LTD., Guangdong (CN)

(72) Inventor: Quanxi Yin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 636 days.

(21) Appl. No.: 17/902,802

(22) Filed: Sep. 3, 2022

(65) Prior Publication Data

US 2022/0416557 A1    Dec. 29, 2022

Related U.S. Application Data

(63) Continuation of application No. PCT/CN2021/075175, filed on Feb. 4, 2021.

(30) Foreign Application Priority Data

Mar. 6, 2020  (CN) .......................... 202010153531.X

(51) Int. Cl.
    *H02J 7/00*  (2006.01)
    *H02J 7/34*  (2006.01)

(52) U.S. Cl.
    CPC ........ *H02J 7/00712* (2020.01); *H02J 7/0013* (2013.01); *H02J 7/342* (2020.01)

(58) Field of Classification Search
    CPC ...... H02J 7/00712; H02J 7/0013; H02J 7/342; H02J 7/00034; H02J 2207/30; H02J 7/007; Y02E 60/10

(Continued)

(56) References Cited

U.S. PATENT DOCUMENTS 8,560,751 B2 * 10/2013 Jung .................... G06F 13/385
                                                   710/316
9,336,170 B2 *  5/2016 Hong .................... G06F 1/266
(Continued)

FOREIGN PATENT DOCUMENTS

CN    103164383 A  *  6/2013  ............. G06F 15/16
CN    204883583 U     12/2015
(Continued)

OTHER PUBLICATIONS

Extended European Search Report for Application No. 21765242.9-1202, dated Jun. 30, 2023, 7 Pages.

(Continued)

*Primary Examiner* — M Baye Diao
(74) *Attorney, Agent, or Firm* — BROOKS KUSHMAN P.C.

(57) ABSTRACT

An electronic device including a first switch module, a first electrical connection terminal, a second electrical connection terminal, and a control module. The first switch module is electrically connected between the first electrical connection terminal and the second electrical connection terminal, the first electrical connection terminal is configured to electrically connect to a third electrical connection terminal of a second electronic device, and the second electrical connection terminal is configured to electrically connect to a fourth electrical connection terminal of the second electronic device. The control module is connected to the first switch module to control the first switch module to switch between an on state and an off state.

10 Claims, 8 Drawing Sheets

(58) Field of Classification Search
USPC .......................................................... 320/138
See application file for complete search history.

(56) References Cited

U.S. PATENT DOCUMENTS

| | | | | |
|---|---|---|---|---|
| 10,043,123 | B2* | 8/2018 | Li | .................. G06K 19/0715 |
| 10,050,460 | B2 | 8/2018 | Li et al. | |
| 10,317,867 | B2* | 6/2019 | Moore | .................. F24F 11/58 |
| 11,451,067 | B2* | 9/2022 | Regupathy | .............. H02J 7/342 |
| 11,611,221 | B2* | 3/2023 | Tao | .................. G06F 1/266 |
| 2012/0242282 | A1 | 9/2012 | Wada et al. | |
| 2014/0239886 | A1 | 8/2014 | Lalitnuntikul et al. | |
| 2021/0399561 | A1* | 12/2021 | Lim | .................. G06F 1/30 |

FOREIGN PATENT DOCUMENTS

| | | | |
|---|---|---|---|
| CN | 106026247 | A | 10/2016 |
| CN | 106712179 | A | 5/2017 |
| CN | 108631401 | A | 10/2018 |
| CN | 109918327 | A | 6/2019 |
| CN | 110620602 | A | 12/2019 |
| CN | 110829523 | A | 2/2020 |
| CN | 111245057 | A | 6/2020 |
| EP | 3525312 | A1 | 8/2019 |
| EP | 3598604 | A2 | 1/2020 |
| JP | 2012205366 | A | 10/2012 |

OTHER PUBLICATIONS

First Office Action for Chinese Application No. 202010153531.X, dated Feb. 19, 2021, 8 Pages.
International Search Report and Written Opinion for Application No. PCT/CN2021/075175, dated Apr. 23, 2021, 9 Pages.
Japanese Office Action for Japanese Application No. 2022-552488 dated Sep. 5, 2022, 4 pages.
The Wayback Machine—https://web.archive.org/web/20190316191209/http://obddiag.net/sub-power.html, Charging smartphone from USB without fear, 3 pages, Sep. 20, 2023.

* cited by examiner

ELECTRONIC DEVICE

CROSS-REFERENCE TO RELATED APPLICATIONS

This application is a continuation of PCT International Application No. PCT/CN2021/075175 filed on Feb. 4, 2021, which claims priority to Chinese Patent Application 202010153531.X, filed on Mar. 6, 2020, which are incorporated herein by reference in their entireties.

TECHNICAL FIELD

The present application relates to the terminal field, and in particular, to an electronic device.

BACKGROUND

Currently, more electronic devices (such as mobile phones) have a reverse charging function. As a master device, an electronic device having a reverse charging function can output its power to another external device serving as a slave device.

In reverse charging, an electronic device in the related art tends to charge an external electronic device in a fixed mode. In this mode, an output charging current tends to be small, for example, being a fixed value of 0.5 A.

However, in the reverse charging mode in the related art, reverse large current charging cannot be performed in a scenario in which a larger charging current is required.

SUMMARY

According to a first aspect, an electronic device is provided. The electronic device includes a first switch module, a first electrical connection terminal, a second electrical connection terminal, and a control module, where the first switch module is electrically connected between the first electrical connection terminal and the second electrical connection terminal, the first electrical connection terminal is electrically connected to a third electrical connection terminal of a second electronic device, and the second electrical connection terminal is electrically connected to a fourth electrical connection terminal of the second electronic device; the control module is connected to the first switch module to control the first switch module to switch between an on state and an off state; and when the first switch module is in the on state, the electronic device outputs a first current; or when the first switch module is in the off state, the electronic device outputs a second current.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show merely some embodiments described in the present application, and a person of ordinary skill in the art may still derive other drawings from these accompanying drawings without creative efforts.

DETAILED DESCRIPTION

Figure 1:
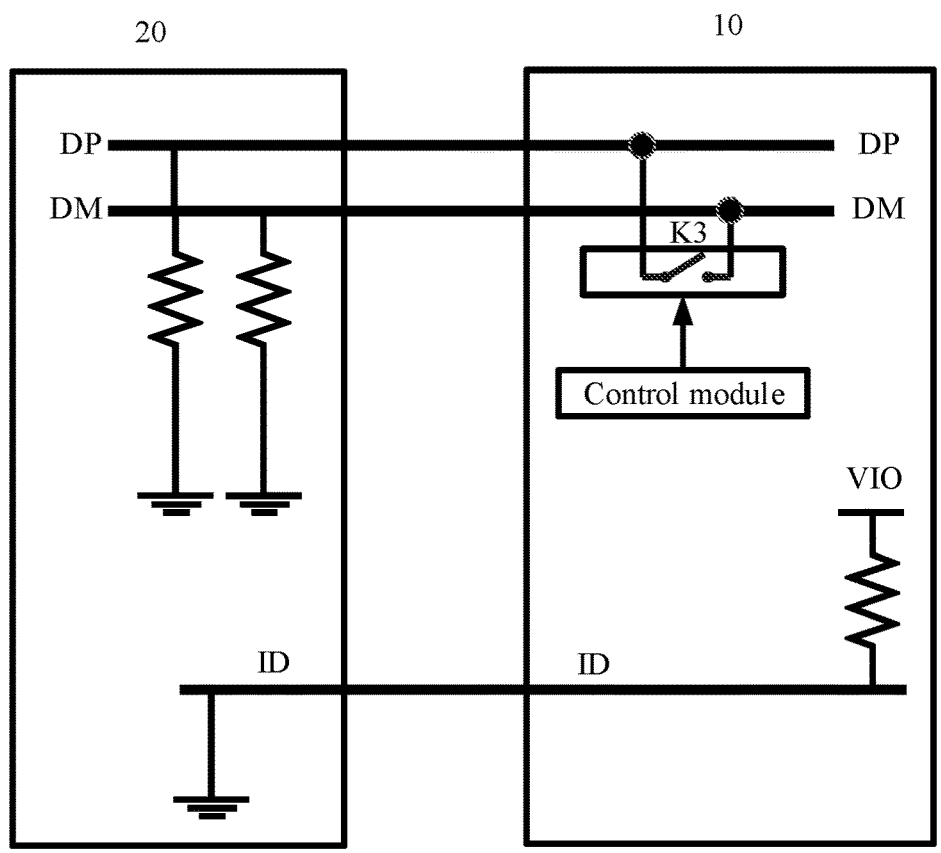
FIG. 1 is a schematic diagram of an electronic device according to an embodiment of the present application.

The following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Embodiments of this application provide an electronic device to increase a charging current for reverse charging.

The electronic device in the embodiments of this application provides includes the first switch module, the first electrical connection terminal, the second electrical connection terminal, and the control module, where the first switch module is electrically connected between the first electrical connection terminal of the electronic device and the second electrical connection terminal of the electronic device, the first electrical connection terminal is electrically connected to the third electrical connection terminal of the second electronic device, and the second electrical connection terminal is electrically connected to the fourth electrical connection terminal of the second electronic device; the control module is connected to the first switch module to control the first switch module to switch between an on state and an off state; and when the first switch module is in the on state, the electronic device outputs the first current; or when the first switch module is in the off state, the electronic device outputs the second current. In this way, the first switch module is disposed and the first switch module is controlled to switch between the on state and the off state, in a case that a large charging current is required, the first switch module may be set to the on state, so that the electronic device can output a larger charging current. In this way, further, an electronic device such as a mobile phone can perform charging with a larger current during reverse charging.

In the embodiments of this application, a charging mode may include at least a charging mode of any voltage/current specification, such as a standard charging mode, a non-standard charging mode, a data mode, a protocol charging mode, or a special charging mode. The special charging mode may be a charging mode when a first electronic device reversely charges a second electronic device of a special type. The second electronic device of the special type is an electronic device whose operating system is different from that of the first electronic device or an electronic device whose type is different from that of the first electronic device. For example, if the first electronic device is an Android mobile phone, the second electronic device of the special type may be an electronic device whose operating system is different from that of the first electronic device, such as an Apple device, or may be an electronic device whose type is different from that of the first electronic device, such as an in-vehicle device.

Actually, a voltage/current specification of any charging mode is not fixed. Different manufacturers can define a voltage/current specification of each charging mode within a voltage/current range. The following is an example of a specific voltage/current specification of a common charging mode. For example, a voltage/current specification of the standard charging mode may be 5V/2 A; a voltage/current specification of the non-standard charging mode may be 5V/1 A; a voltage/current specification of the data mode may be 5V/0.5 A; a voltage/current specification of the protocol charging mode may be 9V/2 A; and in a case that the second electronic device is the foregoing electronic device of the special type, the voltage/current specification of the special charging mode may be 5V/2 A.

Among the following five charging modes, a first charging mode may be the non-standard charging mode, and an output current is $I_1$, where $I_1$ may be 1 A; a second charging mode may be the data mode, and an output current is $I_2$, where $I_2$ may be 0.5 A; a third charging mode may be the standard charging mode, and an output current is $I_3$, where $I_3$ may be 2 A; a fourth charging mode may be the protocol charging mode, and an output current is 14, where $I_4$ may be 2 A; and a fifth charging mode may be the special charging mode, and an output current is $I_5$, where $I_5$ may be 2 A.

Among the following five charging modes, when the first switch module is in an on state, the electronic device outputs a first current; or when the first switch module is in an off state, the electronic device outputs a second current. For example, the electronic device may output the first current in the third charging mode (for example, the standard charging mode), and the electronic device may output the second current in other charging modes among the five charging modes. In addition, the first current output by the electronic device may be greater than or equal to the second current output by the electronic device.

Specifically, the first current output by the electronic device in the third charging mode may correspond to $I_3$, where $I_3$ may be 2 A; the second current output by the electronic device in the non-standard charging mode may correspond to $I_1$; and the second current output in the data mode may correspond to $I_2$, where $I_1$ may be 1 A, and $I_2$ may be 0.5 A. In this case, $I_3$ is greater than $I_1$, $I_3$ is greater than $I_2$, and the first current is greater than the second current. The second current output by the electronic device in the protocol charging mode may correspond to $I_4$; and the second current output in the special charging mode may correspond to $I_5$, where $I_3$ may be 2 A, $I_4$ may be 2 A, and $I_5$ may be 2 A. In this case, $I_3=I_4$, $I_3=I_5$, and the first current is equal to the second current.

Certainly, it should be understood that the embodiments of this application are not limited to this. In a case that a plurality of switch modules coexist, a value of the first current or a value of the second current can alternatively be adjusted based on a requirement by controlling turn-on of each switch module and/or a voltage provided by a power supply.

In the following embodiment, a first electronic device is connected to a second electronic device by using a connection cable, and the connection cable may be a USB (Universal Serial Bus) connection cable, such as a USB OTG (On-The-Go) connection cable. In the USB OTG specification, an interface of the USB connection cable generally has five pins: a $V_{BUS}$ pin, a GND (ground) pin, a DP (Data Positive) pin, a DM (Data Negative) pin, and an ID (identification) pin. Correspondingly, the USB connection cable generally has five leads: a power supply ($V_{BUS}$) lead, a ground (GND) lead, a positive data (DP) lead, a negative data (DM) lead, and an ID lead. The power lead is used to output a voltage, the GND lead is used for grounding, the DP lead and the DM lead are used to transmit data signals, and the ID lead is used to identify a master/slave property of the device.

In the description of the following embodiment, it is assumed that the connection cable is a USB OTG connection cable. In a case that the first electronic device is electrically connected to the second electronic device by using the connection cable, as shown in FIG. 1, an ID pin of the first electronic device 10 is connected to a voltage VIO, the first electronic device is a master charging device, an ID pin of the second electronic device 20 is grounded, and the second electronic device is a slave charging device. In this case, the first electronic device can charge the second electronic device.

In the following embodiment, a switch module may include only a switch element, the switch module may further include a switch element and a resistance element connected in series to the switch element, and the switch module may further include other components. The switch element may be a MOSFET (Metal-Oxide-Semiconductor Field-Effect Transistor, metal-oxide-semiconductor field-effect transistor) or another component having a switch function. In addition, positions of a switch element and a resistance element in a same switch module can be interchanged.

FIG. 1 is a schematic diagram of an electronic device according to an embodiment of the present application. The electronic device provided in this embodiment of the present application may be the first electronic device 10 in FIG. 1, and the second electronic device 20 is connected to the first electronic device 10.

An embodiment of the present application provides an electronic device. The electronic device includes a first switch module, a first electrical connection terminal, a second electrical connection terminal, and a control module, where the first switch module is electrically connected between the first electrical connection terminal and the second electrical connection terminal, the first electrical connection terminal is configured to electrically connect to a third electrical connection terminal of a second electronic device, and the second electrical connection terminal is configured to electrically connect to a fourth electrical connection terminal of the second electronic device; the control module is connected to the first switch module to control the first switch module to switch between an on state and an off state; and when the first switch module is in the on state, the electronic device outputs a first current; or when the first switch module is in the off state, the electronic device outputs a second current.

The control module can control a switch function of the switch module. Specifically, the control module may be a processor, a single-chip microcomputer, or other chips having processing functions.

Specifically, as shown in FIG. 1, the first switch module of the first electronic device 10 may be a switch K3. The switch K3 is electrically connected between the first electrical connection terminal's DP pin of the first electronic device 10 and the second electrical connection terminal's DM pin of the first electronic device 10. In a case that the first electronic device 10 is connected to the second electronic device 20, the first electrical connection terminal's DP pin is electrically connected to the third electrical connection terminal's DP pin of the second electronic device 20, and the second electrical connection terminal's DM pin is electrically connected to the fourth electrical connection terminal's DM pin of the second electronic device 20.

An embodiment of the present application provides a reverse charging method. The method may be performed by the first electronic device 10 shown in FIG. 1. The method includes: in a case that the first electronic device 10 is electrically connected to the second electronic device, obtaining a charging instruction, where the charging instruction indicates a charging mode; and controlling, based on the charging mode indicated by the charging instruction, the first switch module to be turned on.

As shown in FIG. 1, a first charging mode may be a non-standard charging mode, and in a case that the electronic device is in the first charging mode, the control module controls the first switch module to be in the off state. Specifically, the switch K3 is controlled to be turned off, so that the first electronic device 10 can charge the second electronic device 20 in the non-standard charging mode, where a second output current is $I_1$, and $I_1$ is 1 A.

As shown in FIG. 1, a third charging mode may be a standard charging mode, and in a case that the electronic device is in the third charging mode, the control module controls the first switch module to be in the on state. Specifically, the switch K3 is controlled to be turned on, so that the first electronic device 10 can charge the second electronic device 20 in the standard charging mode, where a first output current is $I_3$, and $I_3$ is 2 A.

Figure 2:
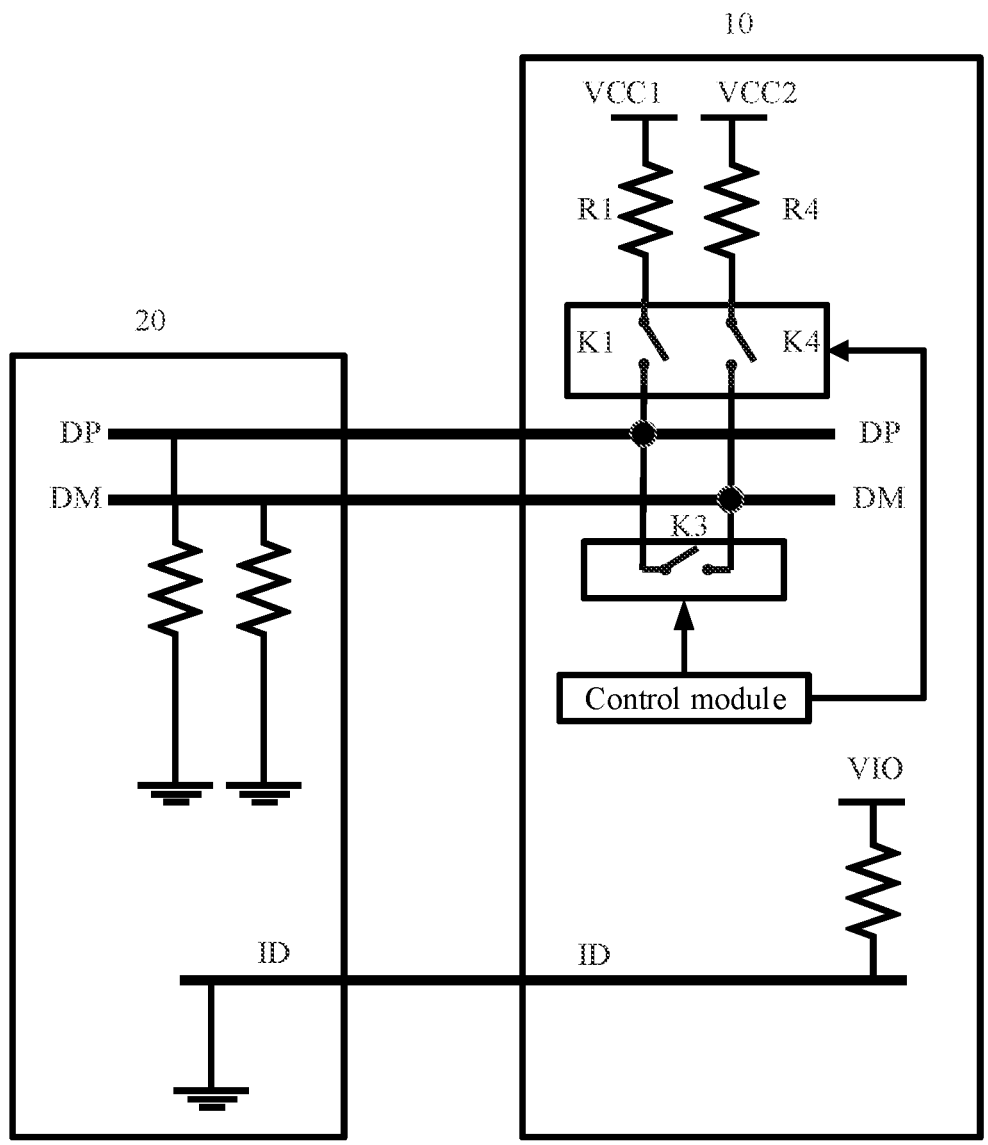
FIG. 2 is a schematic diagram of another electronic device according to an embodiment of the present application.

FIG. 2 is a schematic diagram of another electronic device according to an embodiment of the present application. As shown in FIG. 2, the electronic device provided in this embodiment of the present application may be a first electronic device 10 in FIG. 2, and a second electronic device 20 is connected to the first electronic device.

In the description of this embodiment of this application, it is assumed that the connection cable is a USB OTG connection cable. In a case that the first electronic device is electrically connected to the second electronic device by using the connection cable, as shown in FIG. 2, an ID pin of the first electronic device 10 is connected to a voltage VIO, the first electronic device 10 is a master charging device, an ID pin of the second electronic device 20 is grounded, and the second electronic device 20 is a slave charging device. In this case, the first electronic device 10 can charge the second electronic device 20.

An embodiment of the present application provides an electronic device. The electronic device includes a first switch module, a first electrical connection terminal, a second electrical connection terminal, and a control module, where the first switch module is electrically connected between the first electrical connection terminal and the second electrical connection terminal, the first electrical connection terminal is configured to electrically connect to a third electrical connection terminal of a second electronic device, and the second electrical connection terminal is configured to electrically connect to a fourth electrical connection terminal of the second electronic device; the control module is connected to the first switch module to control the first switch module to switch between an on state and an off state; and when the first switch module is in the on state, the electronic device outputs a first current; or when the first switch module is in the off state, the electronic device outputs a second current.

The electronic device further includes a first power supply, a second power supply, a second switch module, and a third switch module. The control module is connected to the second switch module to control the second switch module to switch between the on state and the off state. In addition, the control module is connected to the third switch module to control the third switch module to switch between the on state and the off state. The first power supply is connected to the first electrical connection terminal, and the second power supply is connected to the second electrical connection terminal. A first end of the second switch module is electrically connected to the first power supply, and a second end of the second switch module is electrically connected to the first electrical connection terminal. A first end of the third switch module is electrically connected to the second power supply, and a second end of the third switch module is electrically connected to the second electrical connection terminal.

Specifically, as shown in FIG. 2, the first electronic device 10 includes a first switch module K3. The first switch module K3 is electrically connected between the first electrical connection terminal's DP pin and the second electrical connection terminal's DM pin. In a case that the first electronic device 10 is connected to the second electronic device 20, the first electrical connection terminal's DP pin is electrically connected to the third electrical connection terminal's DP pin of the second electronic device 20, and the second electrical connection terminal's DM pin is electrically connected to the fourth electrical connection terminal's DM pin of the second electronic device 20.

The second switch module includes a first switch element and a first resistor connected in series to the first switch element, and the third switch module includes a second switch element and a second resistor connected in series to the second switch element. The first switch element is electrically connected to the first electrical connection terminal, and the first resistor is electrically connected to the first power supply; or the first switch element is electrically connected to the first power supply, and the first resistor is electrically connected to the first electrical connection terminal. The second switch element is electrically connected to the second electrical connection terminal, and the second resistor is electrically connected to the second power supply; or the second switch element is electrically connected to the second power supply, and the second resistor is electrically connected to the second electrical connection terminal.

As shown in FIG. 2, the first electronic device 10 further includes a first power supply VCC1, a second power supply VCC2, a second switch module, and a third switch module. The first power supply VCC1 is connected to the first electrical connection terminal's DP pin of the electronic device, the second power supply VCC2 is connected to the second electrical connection terminal's DM pin of the electronic device, the second switch module may include a switch K1 and a resistor R1, and the third switch module may include a switch K4 and a resistor R4. A first-end resistor R1 of the second switch module is electrically connected to the first power supply VCC1, and a second-end switch K1 of the second switch module is electrically connected to the first electrical connection terminal's DP pin. A first-end resistor R4 of the third switch module is electrically connected to the second power supply VCC2, and a second-end switch K4 of the third switch module is electrically connected to the second electrical connection terminal's DM pin.

Specifically, as shown in FIG. 2, the second switch module may include a first switch element K1 and a first resistor R1 connected in series to the first switch element, and the third switch module includes a second switch element K4 and a second resistor R4 connected in series to the second switch element. The first switch element K1 is electrically connected to the first electrical connection terminal, and the first resistor R1 is electrically connected to the first power supply VCC1. The second switch element K4 is electrically connected to the second electrical connection terminal, and the second resistor R4 is electrically connected to the second power supply VCC2.

In addition, in this embodiment of this application, positions of a switch element and a resistor in a same switch module may be interchanged. For example, the first switch element K1 is electrically connected to the first power supply VCC1, and the first resistor R1 is electrically connected to the first electrical connection terminal; and the second switch element K4 is electrically connected to the second power supply VCC2, and the second resistor R4 is electrically connected to the second electrical connection terminal.

An embodiment of the present application provides a reverse charging method. The method may be performed by the first electronic device 10 shown in FIG. 2. The method includes: in a case that the first electronic device 10 is electrically connected to the second electronic device, obtaining a charging instruction, where the charging instruction indicates a charging mode; and controlling, based on the charging mode indicated by the charging instruction, the first switch module, the second switch module, and the third switch module to be turned on.

As shown in FIG. 2, a first charging mode may be a non-standard charging mode, and in a case that the electronic device is in the first charging mode, the control module controls all of the first switch module, the second switch module, and the third switch module to be in the off state. Specifically, the switches K3, K1, and K4 are turned off, so that the first electronic device 10 can charge the second electronic device 20 in the non-standard charging mode, where a second output current is $I_1$, and $I_1$ is 1 A.

As shown in FIG. 2, a third charging mode may be a standard charging mode, and in a case that the electronic device is in the third charging mode, the control module controls the first switch module to be in the on state, and the control module controls both the second switch module and the third switch module to be in the off state. Specifically, the switch K3 is turned on, and the switches K1 and K4 are turned off, so that the first electronic device 10 can charge the second electronic device 20 in the standard charging mode, where a first output current is $I_3$, and $I_3$ is 2 A.

As shown in FIG. 2, a fourth charging mode may be a protocol charging mode, and in a case that the electronic device is in the fourth charging mode, the control module controls the first switch module to be in the off state, and the control module controls both the second switch module and the third switch module to be in the on state. Specifically, the switch K3 is turned off, and the switches K1 and K4 are turned on, so that the first electronic device 10 can charge the second electronic device 20 in the protocol charging mode, where a second output current is $I_4$, and $I_4$ is 2 A.

Optionally, in this embodiment of this application, the first power supply is a voltage-adjustable power supply, and/or the second power supply is a voltage-adjustable power supply.

Specifically, as shown in FIG. 2, the second switch module and the third switch module are both turned on, and the charging method includes: in a case that the electronic device is electrically connected to the second electronic device, obtaining a charging instruction, where the charging instruction indicates a charging mode; controlling, based on the charging mode indicated by the charging instruction, a voltage of the first power supply VCC1, to adjust a potential on the first electrical connection terminal's DP pin; and controlling a voltage of the second power supply VCC2, to adjust a potential on the second electrical connection terminal's DM pin.

For example, the charging mode indicated by the charging instruction may be the standard charging mode. When the potential on the DP pin and the potential on the DM pin are adjusted, the potential on the DP pin may be adjusted to 0.6V, and the potential on the DM pin may be adjusted to 0.6V, so that the first electronic device 10 can charge the second electronic device 20 in the standard charging mode.

For example, the charging mode indicated by the charging instruction may be the non-standard charging mode. When the potential on the DP pin and the potential on the DM pin are adjusted, the potential on the DP pin may be adjusted to 3.3V, and the potential on the DM pin may be adjusted to 3.3V, so that the first electronic device 10 can charge the second electronic device 20 in the non-standard charging mode.

For example, the charging mode indicated by the charging instruction may be a data mode. When the potential on the DP pin and the potential on the DM pin are adjusted, the potential on the DP pin may be adjusted to 0.6V, and the potential on the DM pin may be adjusted to 0V, so that the first electronic device 10 can charge the second electronic device 20 in the data mode.

For example, the charging mode indicated by the charging instruction may be the protocol charging mode. When the potential on the DP pin and the potential on the DM pin are adjusted, the potential on the DP pin may be adjusted to 3.3V, and the potential on the DM pin may be adjusted to 0.6V, so that the first electronic device 10 can charge the second electronic device 20 in the protocol charging mode.

For example, in a case that the second electronic device is the foregoing electronic device of the special type, the charging mode indicated by the charging instruction may be a special charging mode. When the potential on the DP pin and the potential on the DM pin are adjusted, the potential on the DP pin may be adjusted to 2.0V, and the potential on the DM pin may be adjusted to 2.7V, so that the first electronic device 10 can charge the second electronic device 20 in the special charging mode.

Figure 3:
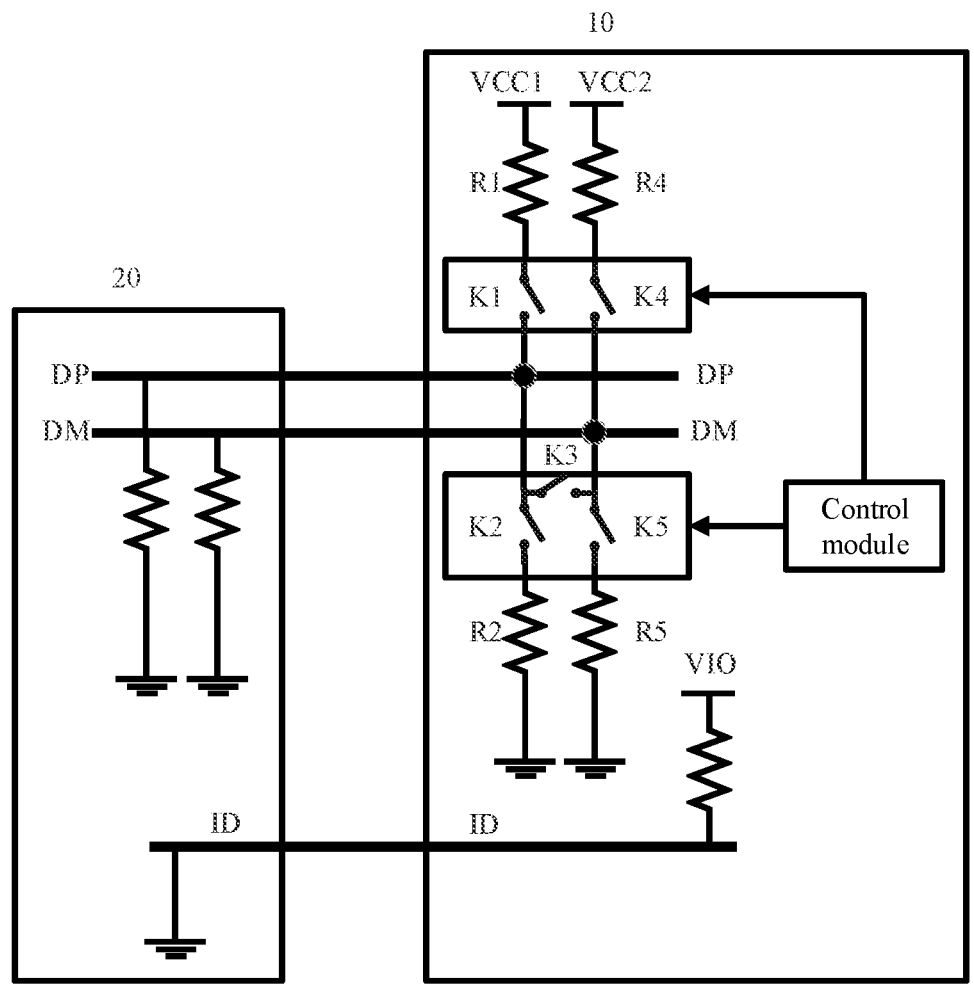
FIG. 3 is a schematic diagram of still another electronic device according to an embodiment of the present application.

FIG. 3 is a schematic diagram of an electronic device according to an embodiment of the present application. As shown in FIG. 3, the electronic device provided in this embodiment of the present application may be a first electronic device 10 in FIG. 3, and a second electronic device 20 is connected to the first electronic device 10.

In the description of this embodiment of this application, it is assumed that the connection cable is a USB OTG connection cable. In a case that the first electronic device 10 is electrically connected to the second electronic device 20 by using the connection cable, as shown in FIG. 3, an ID pin of the first electronic device 10 is connected to a voltage VIO, the first electronic device 10 is a master charging device, an ID pin of the second electronic device 20 is grounded, and the second electronic device 20 is a slave charging device. In this case, the first electronic device 10 can charge the second electronic device 20.

An embodiment of the present application provides an electronic device. The electronic device includes a first switch module, a first electrical connection terminal, a second electrical connection terminal, and a control module, where the first switch module is electrically connected between the first electrical connection terminal and the second electrical connection terminal, the first electrical connection terminal is configured to electrically connect to a third electrical connection terminal of a second electronic device, and the second electrical connection terminal is configured to electrically connect to a fourth electrical connection terminal of the second electronic device; the control module is connected to the first switch module to control the first switch module to switch between an on state and an off state; and when the first switch module is in the on state, the electronic device outputs a first current; or when the first switch module is in the off state, the electronic device outputs a second current.

The electronic device further includes a first power supply, a second power supply, a second switch module, and a third switch module. The control module is connected to the second switch module to control the second switch module to switch between the on state and the off state. In addition, the control module is connected to the third switch module to control the third switch module to switch between the on state and the off state. The first power supply is connected to the first electrical connection terminal, and the second power supply is connected to the second electrical connection terminal. A first end of the second switch module is electrically connected to the first power supply, and a second end of the second switch module is electrically connected to the first electrical connection terminal. A first end of the third switch module is electrically connected to the second power supply, and a second end of the third switch module is electrically connected to the second electrical connection terminal.

The electronic device further includes a fourth switch module and a fifth switch module. The control module is connected to the fourth switch module to control the fourth switch module to switch between the on state and the off state. In addition, the control module is connected to the fifth switch module to control the fifth switch module to switch between the on state and the off state. A first end of the fourth switch module is electrically connected to the first electrical connection terminal, and a second end of the fourth switch module is grounded. A first end of the fifth switch module is electrically connected to the second electrical connection terminal, and a second end of the fifth switch module is grounded.

The fourth switch module includes a third switch element and a third resistor connected in series to the third switch element, and the fifth switch module includes a fourth switch element and a fourth resistor connected in series to the fourth switch element. The third switch element is electrically connected to the first electrical connection terminal, and the third resistor is grounded; or the third switch element is grounded, and the third resistor is electrically connected to the first electrical connection terminal. The fourth switch element is electrically connected to the second electrical connection terminal, and the fourth resistor is grounded; or the fourth switch element is grounded, and the fourth resistor is electrically connected to the second electrical connection terminal.

Specifically, as shown in FIG. 3, the first electronic device 10 includes a first switch module K3. The first switch module K3 is electrically connected between the first electrical connection terminal's DP pin and the second electrical connection terminal's DM pin. In a case that the electronic device 10 is connected to the second electronic device 20, the first electrical connection terminal's DP pin is electrically connected to the third electrical connection terminal's DP pin of the second electronic device 20, and the second electrical connection terminal's DM pin is electrically connected to the fourth electrical connection terminal's DM pin of the second electronic device.

As shown in FIG. 3, the first electronic device 10 further includes a first power supply VCC1, a second power supply VCC2, a second switch module, and a third switch module. The first power supply VCC1 is connected to the first electrical connection terminal's DP pin of the electronic device, the second power supply VCC2 is connected to the second electrical connection terminal's DM pin of the electronic device, the second switch module may include a switch K1 and a resistor R1, and the third switch module may include a switch K4 and a resistor R4. A first-end resistor R1 of the second switch module is electrically connected to the first power supply VCC1, and a second-end switch K1 of the second switch module is electrically connected to the first electrical connection terminal's DP pin. A first-end resistor R4 of the third switch module is electrically connected to the second power supply VCC2, and a second-end switch K4 of the third switch module is electrically connected to the second electrical connection terminal's DM pin.

As shown in FIG. 3, the first electronic device 10 further includes a fourth switch module and a fifth switch module. The fourth switch module may include a switch K2 and a resistor R2, and the fifth switch module may include a switch K5 and a resistor R5. A first-end switch K2 of the fourth switch module is electrically connected to the first electrical connection terminal's DP pin, and a second-end resistor R2 of a second switch of the fourth switch module is grounded. A first-end switch K5 of the fifth switch module is electrically connected to the second electrical connection terminal's DM pin, and a second-end resistor R5 of the fifth switch module is grounded.

Specifically, as shown in FIG. 3, the fourth switch module includes a third switch element K2 and a third resistor R2 connected in series to the third switch element, and the fifth switch module includes a fourth switch element K5 and a fourth resistor R5 connected in series to the fourth switch element. The third switch element K2 is electrically connected to the first electrical connection terminal, and the third resistor R2 is grounded. The fourth switch element K5 is connected to the second electrical connection terminal, and the fourth resistor R5 is grounded.

In addition, in this embodiment of this application, positions of a switch element and a resistor in a same switch module may be interchanged. For example, the third switch element K2 is grounded, and the third resistor R2 is electrically connected to the first electrical connection terminal; and the fourth switch element K5 is grounded, and the fourth resistor R5 is electrically connected to the second electrical connection terminal.

An embodiment of the present application provides a reverse charging method. The method may be performed by the first electronic device 10 shown in FIG. 3. The method includes: in a case that the electronic device is electrically connected to the second electronic device, obtaining a charging instruction, where the charging instruction indicates a charging mode; and controlling, based on the charging mode indicated by the charging instruction, the first switch module, the second switch module, the third switch module, the fourth switch module, and the fifth switch module to be turned on.

As shown in FIG. 3, a first charging mode may be a non-standard charging mode, and in a case that the electronic device is in the first charging mode, the control module controls all of the first switch module, the second switch module, and the third switch module to be in the off state, and the control module controls both the fourth switch module and the fifth switch module to be in the off state.

Specifically, the switch K3 is turned off, the switches K1 and K4 are turned off, and the switches K2 and K5 are turned off, so that the first electronic device 10 can charge the second electronic device 20 in the non-standard charging mode, where a second output current is $I_1$, and $I_1$ is 1 A.

As shown in FIG. 3, a second charging mode may be a data mode, and in a case that the electronic device is in the second charging mode, the control module controls all of the first switch module, the second switch module, and the third switch module to be in the off state, and the control module controls both the fourth switch module and the fifth switch module to be in the on state. Specifically, the switch K3 is turned off, the switches K1 and K4 are turned off, and the switches K2 and K5 are turned on, so that the first electronic device 10 can charge the second electronic device 20 in the data mode, where a second output current is $I_2$, and $I_2$ is 0.5 A.

As shown in FIG. 3, a third charging mode may be a standard charging mode, and in a case that the electronic device is in the third charging mode, the control module controls the first switch module to be in the on state, the control module controls both the second switch module and the third switch module to be in the off state, and the control module controls both the fourth switch module and the fifth switch module to be in the off state. Specifically, the switch K3 is turned on, the switches K1 and K4 are turned off, and the switches K2 and K5 are turned off, so that the first electronic device 10 can charge the second electronic device 20 in the standard charging mode, where a first output current is $I_3$, and $I_3$ is 2 A.

As shown in FIG. 3, a fourth charging mode may be a protocol charging mode, and in a case that the electronic device is in the fourth charging mode, the control module controls the first switch module to be in the off state, the control module controls both the second switch module and the third switch module to be in the on state, and the control module controls both the fourth switch module and the fifth switch module to be in the off state. Specifically, the switch K3 is turned off, the switches K1 and K4 are turned on, and the switches K2 and K5 are turned off, so that the first electronic device 10 can charge the second electronic device 20 in the protocol charging mode, where a second output current is $I_4$, and $I_4$ is 2 A.

As shown in FIG. 3, a fifth charging mode may be a special charging mode, and in a case that the electronic device is in the fifth charging mode, the control module controls the first switch module to be in the off state, and the control module controls all of the second switch module, the third switch module, the fourth switch module, and the fifth switch module to be in the on state. Specifically, the switch K3 is turned off, the switches K1 and K4 are turned on, and the switches K2 and K5 are turned on, so that the first electronic device 10 can charge the second electronic device 20 in the special charging mode, where a second output current is $I_5$, and $I_5$ is 2 A.

Based on the same idea as an electronic device provided in an embodiment of the present application, an embodiment of the present application further provides a reverse charging method. The method may be performed by an electronic device, and the electronic device may be a first electronic device mentioned below. The first electronic device may be a mobile terminal used by a user, such as a mobile phone or a tablet. The first electronic device may be connected to another electronic device (for example, a second electronic device mentioned below) by using a connection cable, and reversely charge the second electronic device. In the following description, it is assumed that the first electronic device is a mobile terminal of a user.

Figure 4:
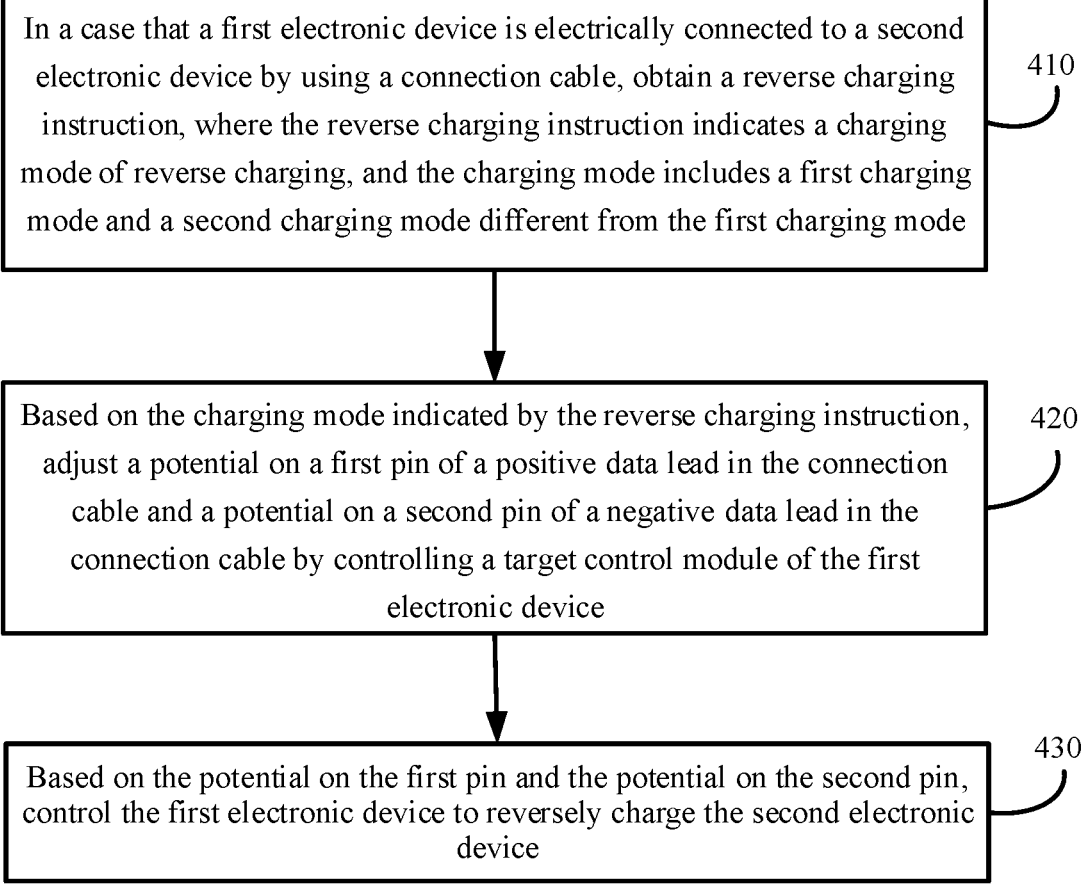
FIG. 4 is a flowchart of a reverse charging method applied to the electronic device in FIG. 1 according to an embodiment of the present application.

FIG. 4 is a flowchart of a reverse charging method according to an embodiment of the present application. The reverse charging method provided in this embodiment of the present application may be applied to a first electronic device, and may include the following steps.

Step 410: In a case that a first electronic device is electrically connected to a second electronic device by using a connection cable, obtain a reverse charging instruction, where the reverse charging instruction indicates a charging mode of reverse charging, and the charging mode includes a first charging mode and a second charging mode different from the first charging mode.

In this embodiment of this application, the first electronic device may be a mobile phone of a user. The first electronic device has a reverse charging function, and can temporarily supply power to another mobile phone or another electronic device in emergency.

In this embodiment of this application, the second electronic device may be another electronic device that needs a temporary emergency power supply, for example, may be another mobile phone, a mouse, a keyboard, a USB disk, or a removable hard disk.

In this embodiment of this application, a specific manner of obtaining the reverse charging instruction in step 410 may be: for example, in the case that the first electronic device is electrically connected to the second electronic device by using the connection cable, different charging mode options are displayed on a displayed man-machine interaction interface box on a screen of the first electronic device, and the user autonomously taps one of the charging mode options based on a requirement; in this case, the first electronic device can obtain the reverse charging instruction carrying charging mode information selected by the user, where the reverse charging instruction is used to indicate the charging mode when the first electronic device reversely charges the second electronic device.

Optionally, in this embodiment of this application, the reverse charging instruction may be triggered by the user by pressing a physical key. In this case, a specific manner of obtaining the reverse charging instruction in step 410 may be: for example, in the case that the first electronic device is electrically connected to the second electronic device by using the connection cable, after the user presses a physical key (for example, a volume key), prompt information for selecting different charging mode options may appear on the screen of the first electronic device, and the user may autonomously select one of the charging mode options based on a requirement; in this case, the first electronic device can obtain the reverse charging instruction carrying charging mode information selected by the user, where the reverse charging instruction is used to indicate the charging mode when the first electronic device reversely charges the second electronic device.

Optionally, in this embodiment of this application, the reverse charging instruction may be obtained from a preset position. In this case, a specific manner of obtaining the reverse charging instruction in step 410 may be: for example, in the case that the first electronic device is electrically connected to the second electronic device by using the connection cable, the first electronic device automatically obtains a charging mode that is prestored in a memory and adaptive to a safe voltage/current specification for charging the second electronic device; in this case, the first electronic device can obtain the reverse charging instruction carrying the charging mode information, where the reverse charging instruction is used to indicate the charging mode when the first electronic device reversely charges the second electronic device.

In this embodiment of this application, the charging mode may be any one of a standard charging mode, a non-standard charging mode, a data mode, a protocol charging mode, and a special charging mode.

Step 420: Based on the charging mode indicated by the reverse charging instruction, adjust a potential on a first pin of a positive data lead in the connection cable and a potential on a second pin of a negative data lead in the connection cable by controlling a target control module of the first electronic device, where the first pin is a pin located on the positive data lead and connected to the first electronic device, and the second pin is a pin located on the negative data lead and connected to the first electronic device.

In the description of this embodiment of this application, it is assumed that the connection cable is a USB OTG connection cable. The positive data lead in the connection cable may be a DP lead in the USB connection cable, the first pin is a DP pin on the positive data lead, the negative data lead in the connection cable is a DM lead in the USB connection cable, and the second pin may be a DM pin on the negative data lead.

In this embodiment of this application, the reverse charging instruction carries the charging mode information, and the potential on the DP pin and the potential on the DM pin are adjusted based on the charging mode indicated by the reverse charging instruction.

For example, the charging mode indicated by the reverse charging instruction may be the standard charging mode. When the potential on the DP pin and the potential on the DM pin are adjusted, the potential on the DP pin may be adjusted to 0.6V, and the potential on the DM pin may be adjusted to 0.6V.

Optionally, for example, the charging mode indicated by the reverse charging instruction may be the non-standard charging mode. When the potential on the DP pin and the potential on the DM pin are adjusted, the potential on the DP pin may be adjusted to 3.3V, and the potential on the DM pin may be adjusted to 3.3V.

Optionally, for example, the charging mode indicated by the reverse charging instruction may be the data mode. When the potential on the DP pin and the potential on the DM pin are adjusted, the potential on the DP pin may be adjusted to 0.6V, and the potential on the DM pin may be adjusted to 0V.

Optionally, for example, the charging mode indicated by the reverse charging instruction may be the protocol charging mode. When the potential on the DP pin and the potential on the DM pin are adjusted, the potential on the DP pin may be adjusted to 3.3V, and the potential on the DM pin may be adjusted to 0.6V.

Optionally, for example, in a case that the second electronic device is the foregoing electronic device of the special type, the charging mode indicated by the reverse charging instruction may be the special charging mode. When the potential on the DP pin and the potential on the DM pin are adjusted, the potential on the DP pin may be adjusted to 2.0V, and the potential on the DM pin may be adjusted to 2.7V.

Step 430: Based on the potential on the first pin and the potential on the second pin, control the first electronic device to reversely charge the second electronic device.

In this embodiment of this application, based on the potential on the first pin and the potential on the second pin, the first electronic device is controlled to reversely charge the second electronic device based on the charging mode indicated by the reverse charging instruction.

In this embodiment of this application, depending on different potential information on the DP pin and the DM pin, the first electronic device is controlled to charge an external device with different voltages and currents.

In addition, in this embodiment of this application, before controlling the first electronic device to reversely charge the second electronic device, the method for controlling the first electronic device to reversely charge the second electronic device further includes: before reversely charging a battery of the second electronic device with a charging current matching the charging mode indicated by the reverse charging instruction, if the second electronic device detects a connection to the first electronic device and successfully shakes hands with the first electronic device by using a charging protocol of the charging mode indicated by the reverse charging instruction, controlling the first electronic device to reversely charge the second electronic device based on the charging mode indicated by the reverse charging instruction; or if the second electronic device detects a connection to the first electronic device and fails to shake hands with the first electronic device by using the charging protocol of the charging mode indicated by the reverse charging instruction, controlling the first electronic device to reversely charge the second electronic device based on a previous charging mode or a prescribed charging mode (for example, the data mode or the standard charging mode).

According to the reverse charging method and the electronic device provided in this embodiment of this application, in the case that the first electronic device is electrically connected to the second electronic device by using the connection cable, the reverse charging instruction is obtained, where the reverse charging instruction indicates the charging mode of reverse charging, and the charging mode includes the first charging mode and the second charging mode different from the first charging mode; based on the charging mode indicated by the reverse charging instruction, the potential on the first pin of the positive data lead in the connection cable and the potential on the second pin of the negative data lead in the connection cable are adjusted by controlling the target control module of the first electronic device, where the first pin is the pin located on the positive data lead and connected to the first electronic device, and the second pin is the pin located on the negative data lead and connected to the first electronic device; and depending on the potential on the first pin and the potential on the second pin, the first electronic device is controlled to reversely charge the second electronic device. In this way, the charging mode of reverse charging can be flexibly switched when the first electronic device (for example, the mobile phone of the user) performs reverse charging, and selectivity and compatibility of a variety of output voltage/current specifications in reverse charging are improved.

Another reverse charging method provided in an embodiment of the present application may be applied to a first electronic device, where a target control module of the first electronic device includes a first switch module, the first switch module is connected to a positive data lead and a negative data lead respectively, and the method may include the following steps: in a case that the first electronic device is electrically connected to a second electronic device by using a connection cable, obtaining a reverse charging instruction, where the reverse charging instruction indicates a charging mode of reverse charging, and the charging mode includes a first charging mode and a second charging mode different from the first charging mode; and based on the charging mode indicated by the reverse charging instruction, by controlling whether to turn on the first switch module, adjusting a potential on a first pin of the positive data lead in the connection cable and a potential on a second pin of the negative data lead in the connection cable.

In this embodiment of this application, specifically, as shown in FIG. 1, the first electronic device 10 is connected to the second electronic device 20 by using the connection cable, the positive data lead is a DP lead, the negative data lead is a DM lead, the first switch module is a module having a switch function, and the first switch module may include a switch K3.

For example, the first switch module is switched to an on state by turning on the switch K3. In this case, a DP pin and a DM pin are shorted. In this case, a potential on the DP pin may be 0.6V, a potential on the DM pin may be 0.6V, and the corresponding charging mode may be a standard charging mode.

For example, the first switch module is switched to an off state by turning off the switch K3. In this case, the DP pin and the DM pin are both unconnected. In this case, the potential on the DP pin may be 3.3V, the potential on the DM pin may be 3.3V, and the corresponding charging mode may be a non-standard charging mode.

Optionally, in another embodiment of this application, the target control module of the first electronic device includes the first switch module, and the first switch module is connected to the positive data lead and the negative data lead respectively. The target control module of the first electronic device further includes a second switch module, a third switch module, a fourth switch module, and a fifth switch module. The fourth switch module and the fifth switch module are both grounded. One end of the second switch module is connected to the positive data lead, and the other end of the second switch module is connected to a power supply. One end of the third switch module is connected to the negative data lead, and the other end of the third switch module is connected to a power supply.

Specifically, as shown in FIG. 3, the first electronic device 10 is connected to the second electronic device 20 by using the connection cable. The first switch module may include a switch K3. The second switch module may include a resistor R1 and a switch K1. The third switch module may include a resistor R4 and a switch K4. The fourth switch module may include a resistor R2 and a switch K2. The fifth switch module may include a resistor R5 and a switch K5. The positive data lead is a DP lead, and the negative data lead is a DM lead.

By switching the switches K1, K2, K3, K4, and K5 between the ON state and the OFF state, the potential on the first pin of the positive data lead in the connection cable and the potential on the second pin of the negative data lead in the connection cable are adjusted.

For example, if the charging mode indicated by the reverse charging instruction is the data mode, based on the charging mode indicated by the reverse charging instruction, the switches K1, K3, and K4 are controlled to be turned off, the switches K2 and K5 are controlled to be turned on, and values of the resistors R2 and R5 are the same as ground impedance in the data mode. In this case, the potential on the DP pin may be adjusted to 0.6V, the potential on the DM pin may be adjusted to 0V, and the corresponding charging mode is the data mode.

For example, if the charging mode indicated by the reverse charging instruction is the non-standard charging mode, based on the non-standard charging mode indicated by the reverse charging instruction, the switches K1, K2, K3, K4, and K5 are controlled to be turned off, and the DP pin and the DM pin are in an unconnected state. In this case, the potential on the DP pin may be adjusted to 3.3V, the potential on the DM pin may be adjusted to 3.3V, and the corresponding charging mode is the non-standard charging mode.

For example, if the charging mode indicated by the reverse charging instruction is the standard charging mode, based on the standard charging mode indicated by the reverse charging instruction, the switches K1, K2, K4, and K5 are controlled to be turned off, and the switch K3 is controlled to be turned on. In this case, the DP pin and the DM pin are shorted, the potential on the DP pin may be adjusted to 0.6V, the potential on the DM pin may be adjusted to 0.6V, and the corresponding charging mode is the standard charging mode.

For example, if the charging mode indicated by the reverse charging instruction is the protocol mode, based on the protocol mode indicated by the reverse charging instruction, the switches K2, K3, and K5 are controlled to be turned off, and the switches K1 and K4 are controlled to be turned on. In this case, the DP pin and the DM pin are shorted, the potential on the DP pin may be adjusted to 3.3V, the potential on the DM pin may be adjusted to 0.6V, and the corresponding charging mode may be the protocol mode.

For example, in a case that the second electronic device is an electronic device of a special type, if the charging mode indicated by the reverse charging instruction is the special charging mode, based on the special charging mode indicated by the reverse charging instruction, the switches K1, K2, K4, and K5 are controlled to be turned on, and the switch K3 is controlled to be turned off. In this case, the potential on the DP pin may be adjusted to 2.0V, the potential on the DM pin may be adjusted to 2.7V, and the corresponding charging mode is the special charging mode.

Depending on the potential on the first pin and the potential on the second pin, the first electronic device is controlled to reversely charge the second electronic device.

According to the reverse charging method and the electronic device provided in this embodiment of this application, in the case that the first electronic device is electrically connected to the second electronic device by using the connection cable, the reverse charging instruction is obtained, where the reverse charging instruction indicates the charging mode of reverse charging, and the charging mode includes the first charging mode and the second charging mode different from the first charging mode; based on the charging mode indicated by the reverse charging instruction, by controlling whether to turn on the third switch module, the potential on the first pin of the positive data lead in the connection cable is adjusted, and the potential on the second pin of the negative data lead in the connection cable is adjusted; and based on the potential on the first pin and the potential on the second pin, the first electronic device is controlled to reversely charge the second electronic device. In this way, when the first electronic device reversely charges the second electronic device, the charging mode can be switched between the standard charging mode and the non-standard charging mode only by adding a switch between the positive data lead and the negative data lead.

Another reverse charging method provided in an embodiment of the present application may be applied to a first electronic device, where a target control module of the first electronic device includes a second switch module and a third switch module, the second switch module is connected to a positive data lead, the third switch module is connected to a negative data lead, and the method may include the following steps: in a case that the first electronic device is electrically connected to a second electronic device by using a connection cable, obtaining a reverse charging instruction, where the reverse charging instruction indicates a charging mode of reverse charging, and the charging mode includes a first charging mode and a second charging mode different from the first charging mode; and based on the charging mode indicated by the reverse charging instruction, by controlling resistance of the second switch module and/or a voltage of two ends, adjusting a potential on a first pin of the positive data lead in the connection cable; and by controlling resistance of the third switch module and/or a voltage of two ends, adjusting a potential on a second pin of the negative data lead in the connection cable.

In this embodiment of this application, the second switch module may include a first resistor and a first switch, and the first resistor may be one or more resistive components or a component having a resistance value. The resistance value of the second switch module is controlled by turning on/off the first switch. The first switch may be a component having a switch function, such as a MOSFET (Metal-Oxide-Semiconductor Field-Effect Transistor). The second switch module may further include other components. The third switch module may include a second resistor and a second switch, and the second resistor may be one or more resistive components or a component having a resistance value. The resistance value of the third switch module is controlled by turning on/off the second switch. The second switch may be a component having a switch function, such as a MOSFET. The third switch module may further include other components.

Specific manners of adjusting the potential on the first pin of the positive data lead in the connection cable by controlling the resistance of the second switch module and/or the voltage at both ends may include the following two manners.

First manner: In a case that the second switch module is grounded, the adjusting a potential on a first pin of the positive data lead in the connection cable by controlling resistance of the second switch module includes: controlling the resistance of the second switch module by controlling whether to turn on the second switch module, thereby adjusting the potential on the first pin of the positive data lead in the connection cable.

Second manner: In a case that the second switch module is connected to a power supply, the adjusting a potential on a first pin of the positive data lead in the connection cable by controlling resistance of the second switch module and/or a voltage of two ends includes: controlling the resistance of the second switch module by controlling whether to turn on the second switch module, and/or controlling the voltage of the two ends of the second switch module by controlling an input voltage of the second switch module, thereby adjusting the potential on the first pin of the positive data lead in the connection cable.

Specific manners of adjusting the potential on the second pin of the negative data lead in the connection cable by controlling the resistance of the third switch module and/or the voltage at both ends may include the following two manners.

First manner: In a case that the third switch module is grounded, the adjusting a potential on a second pin of the negative data lead in the connection cable by controlling resistance of the third switch module includes: controlling the resistance of the third switch module by controlling whether to turn on the third switch module, thereby adjusting the potential on the second pin of the negative data lead in the connection cable.

Second manner: In a case that the third switch module is connected to a power supply, the adjusting a potential on a second pin of the negative data lead in the connection cable by controlling resistance of the third switch module and/or a voltage of two ends includes: controlling the resistance of the third switch module by controlling whether to turn on the third switch module, and/or controlling the voltage of the two ends of the third switch module by controlling an input voltage of the third switch module, thereby adjusting the potential on the second pin of the negative data lead in the connection cable.

In this embodiment of this application, on a basis of the two specific manners of adjusting the potential on the first pin of the positive data lead in the connection cable and the two specific manners of adjusting the potential on the second pin of the negative data lead in the connection cable, four different manners of adjusting the potential on the first pin of the positive data lead in the connection cable and the potential on the second pin of the negative data lead in the connection cable may be obtained by combining every two of the four manners. The following provides two specific examples of adjusting the potential on the first pin of the positive data lead in the connection cable and the potential on the second pin of the negative data lead in the connection cable.

Figure 5A:
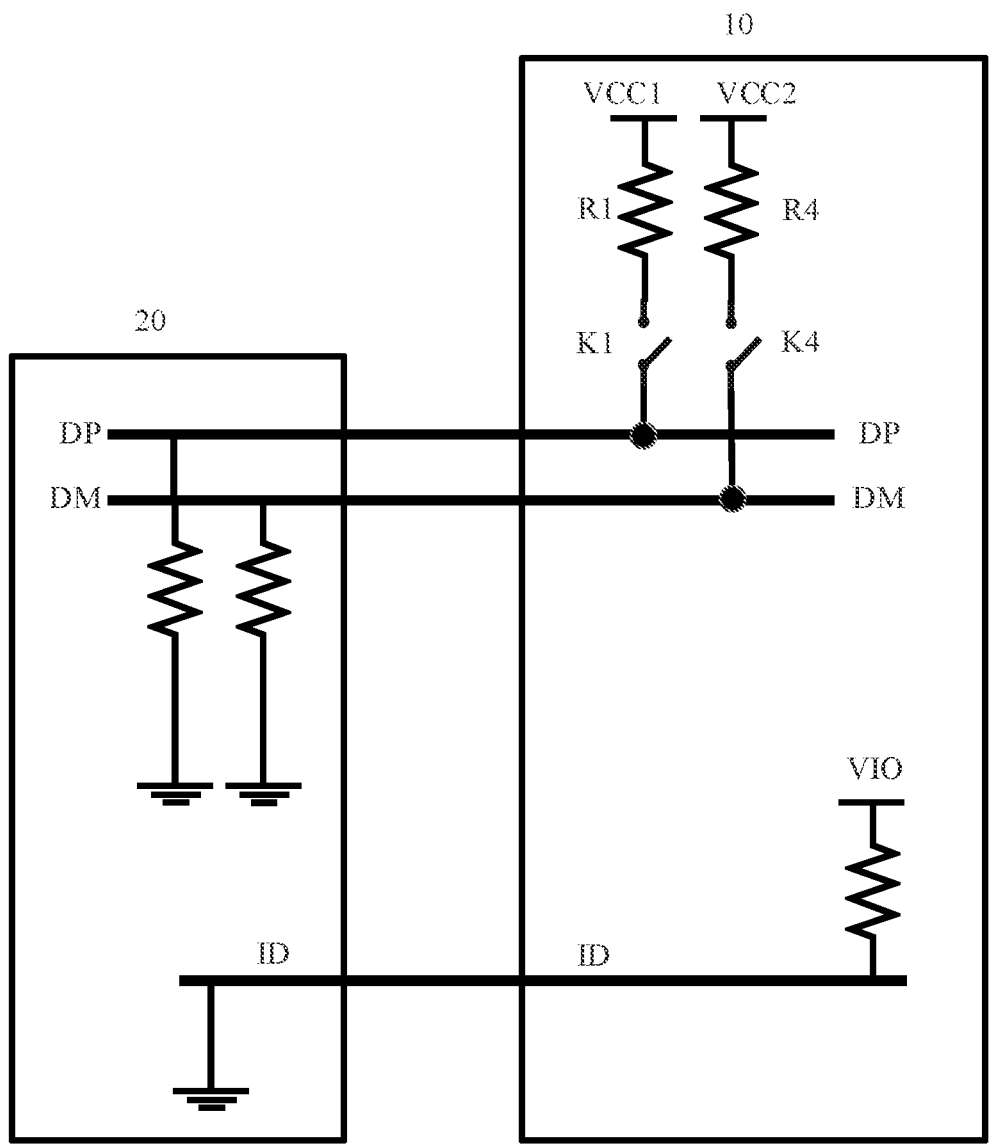
FIG. 5(a), FIG. 5(b), and FIG. 5(c) are schematic diagrams of electronic devices used in a reverse charging method according to an embodiment of the present application.

Optionally, an example obtained by a first combination may be: specifically as shown in FIG. 5(a), the first electronic device 10 is connected to the second electronic device 20 by using the connection cable, the second switch module may be connected to the power supply VCC1, the second switch module may include a resistor R1 and a switch K1, the third switch module may be connected to the power supply VCC2, and the third switch module may include a resistor R4 and a switch K4.

In a case that the second switch module is connected to the power supply, the adjusting a potential on a first pin of the positive data lead in the connection cable by controlling resistance of the second switch module and/or a voltage of two ends includes: controlling the resistance of the second switch module by controlling whether to turn on the second switch module, and/or controlling the voltage of the two ends of the second switch module by controlling the input voltage of the second switch module, thereby adjusting the potential on the first pin of the positive data lead in the connection cable.

In a case that the third switch module is connected to the power supply, the adjusting a potential on a second pin of the negative data lead in the connection cable by controlling resistance of the third switch module and/or a voltage of two ends includes: controlling the resistance of the third switch module by controlling whether to turn on the third switch module, and/or controlling the voltage of the two ends of the third switch module by controlling the input voltage of the third switch module, thereby adjusting the potential on the second pin of the negative data lead in the connection cable.

Based on the charging mode indicated by the reverse charging instruction, specific voltage values of potentials on a DP pin and a DM pin are determined, and by controlling the ON/off states of the switches K1 and K4 and the resistance values of R1 and R4, the potentials on the DP pin and the DM pin are adjusted to specific voltage values determined based on the charging mode indicated by the reverse charging instruction.

Figure 5B:
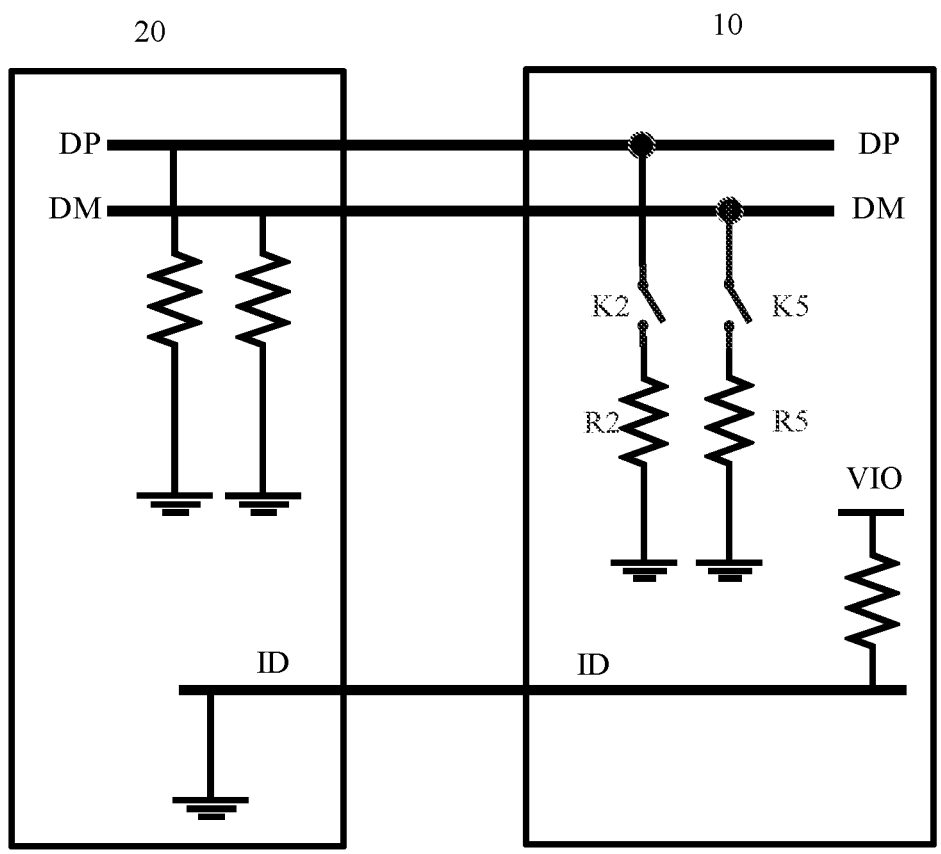

Optionally, an example obtained by a second combination may be: specifically as shown in FIG. 5(b), the first electronic device 10 is connected to the second electronic device 20 by using the connection cable, the second switch module is grounded, the second switch module may include a resistor R2 and a switch K2, the third switch module is grounded, and the third switch module may include a resistor R5 and a switch K5.

In a case that the second switch module is grounded, the adjusting a potential on a first pin of the positive data lead in the connection cable by controlling resistance of the second switch module includes: controlling the resistance of the second switch module by controlling whether to turn on the second switch module, thereby adjusting the potential on the first pin of the positive data lead in the connection cable.

In a case that the third switch module is grounded, the adjusting a potential on a second pin of the negative data lead in the connection cable by controlling resistance of the third switch module includes: controlling the resistance of the third switch module by controlling whether to turn on the third switch module, thereby adjusting the potential on the second pin of the negative data lead in the connection cable.

Based on the charging mode indicated by the reverse charging instruction, specific voltage values of potentials on the DP pin and the DM pin are determined, and by controlling the ON/off states of the switches K1 and K4 and the resistance values of R1 and R4, the potentials on the DP pin and the DM pin are adjusted to specific voltage values determined based on the charging mode indicated by the reverse charging instruction.

Figure 5C:
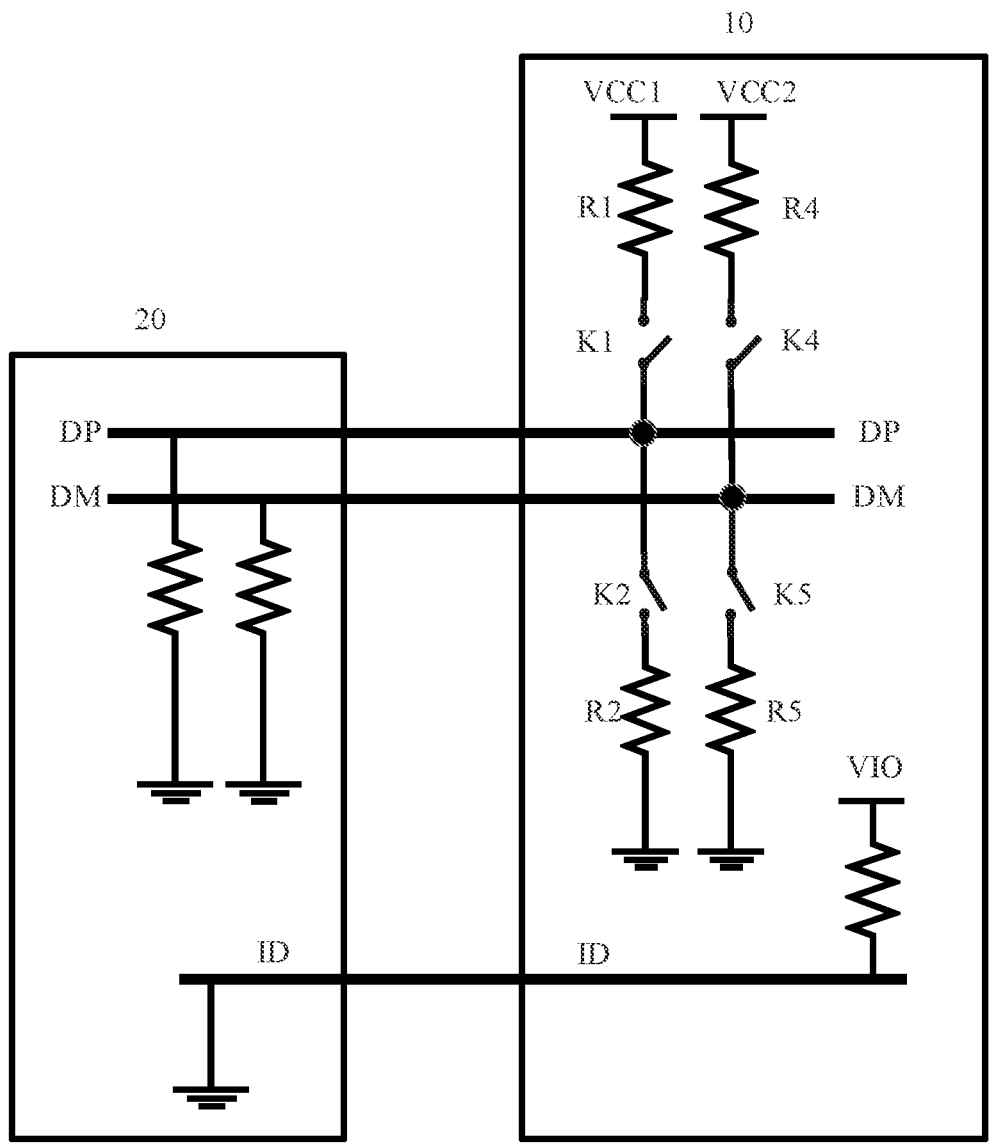

Optionally, in another embodiment of this application, the manners of adjusting the potential on the first pin of the positive data lead in the connection cable and the potential on the second pin of the negative data lead in the connection cable in FIG. 5(a) and FIG. 5(b) may be combined to obtain another manner of adjusting the potential on the first pin of the positive data lead in the connection cable and the potential on the second pin of the negative data lead in the connection cable, as shown in FIG. 5(c).

One end of the second switch module is connected to the positive data lead, and the other end of the second switch module is connected to the power supply. One end of the third switch module is connected to the negative data lead, and the other end of the third switch module is connected to the power supply. The target control module further includes a fourth switch module and a fifth switch module, and the fourth switch module and the fifth switch module are both grounded.

Specifically, as shown in FIG. 5(c), the first electronic device 10 is connected to the second electronic device 20 by using the connection cable, the second switch module includes a resistor R1 and a switch K1, the third switch module includes a resistor R4 and a switch K4, the fourth switch module includes a resistor R2 and a switch K2, the fifth switch module includes a resistor R5 and a switch K5, the positive data lead is a DP lead, and the negative data lead is a DM lead.

The adjusting the potential on the first pin of the positive data lead in the connection cable and the potential on the second pin of the negative data lead in the connection cable by controlling the target control module of the first electronic device includes:

adjusting the potential on the first pin of the positive data lead in the connection cable by controlling at least one of resistance of the first switch module, resistance of the fourth switch module, and a voltage at two ends, and adjusting the potential on the second pin of the negative data lead in the connection cable by controlling at least one of the resistance of the second switch module, the resistance of the third switch module, and the voltage at two ends.

Specifically, as shown in FIG. 5(c), the adjusting the potential on the first pin of the positive data lead in the connection cable by controlling at least one of resistance of the first switch module, resistance of the fourth switch module, and a voltage at two ends, and adjusting the potential on the second pin of the negative data lead in the connection cable by controlling at least one of the resistance of the second switch module, the resistance of the third switch module, and the voltage at two ends, based on the charging mode indicated by the reverse charging instruction, specifically includes the following content:

For example, if the charging mode indicated by the reverse charging instruction is a data mode, based on the charging mode indicated by the reverse charging instruction, the switches K1 and K4 are controlled to be turned off, the switches K2 and K5 are controlled to be turned on, and values of the resistors R2 and R5 are the same as ground impedance in the data mode. In this case, the potential on the DP pin may be adjusted to 0.6V, the potential on the DM pin may be adjusted to 0V, and the corresponding charging mode is the data mode.

For example, if the charging mode indicated by the reverse charging instruction is a non-standard charging mode, based on the non-standard charging mode indicated by the reverse charging instruction, the switches K1, K2, K4, and K5 are controlled to be turned off, and the DP pin and the DM pin are in an unconnected state. In this case, the potential on the DP pin may be adjusted to 3.3V, the potential on the DM pin may be adjusted to 3.3V, and the corresponding charging mode is the non-standard charging mode.

For example, in a case that the second electronic device is an electronic device of a special type, if the charging mode indicated by the reverse charging instruction is a special mode, based on the special charging mode indicated by the reverse charging instruction, the switches K1 and K4 are controlled to be turned on, and the switches K2 and K5 are controlled to be turned off. In this case, the potential on the DP pin may be adjusted to 2.0V, the potential on the DM pin may be adjusted to 2.7V, and the corresponding charging mode is the special charging mode.

Based on the potential on the first pin and the potential on the second pin, the first electronic device is controlled to reversely charge the second electronic device.

According to the reverse charging method and the electronic device provided in this embodiment of this application, in the case that the first electronic device is electrically connected to the second electronic device by using the connection cable, the reverse charging instruction is obtained, where the reverse charging instruction indicates the charging mode of reverse charging, and the charging mode includes the first charging mode and the second charging mode different from the first charging mode; based on the charging mode indicated by the reverse charging instruction, the potential on the first pin of the positive data lead in the connection cable is adjusted by controlling the resistance of the first switch module and/or the voltage at the two ends; the potential on the second pin of the negative data lead in the connection cable is adjusted by controlling the resistance of the second switch module and/or the voltage at the two ends; and based on the potential on the first pin and the potential on the second pin, the first electronic device is controlled to reversely charge the second electronic device. In this way, in the process of adjusting the potential on the first pin and the potential on the second pin, the potentials on the pins can be directly adjusted by adding modules such as resistors and switches, and the solution is highly feasible.

Figure 6:
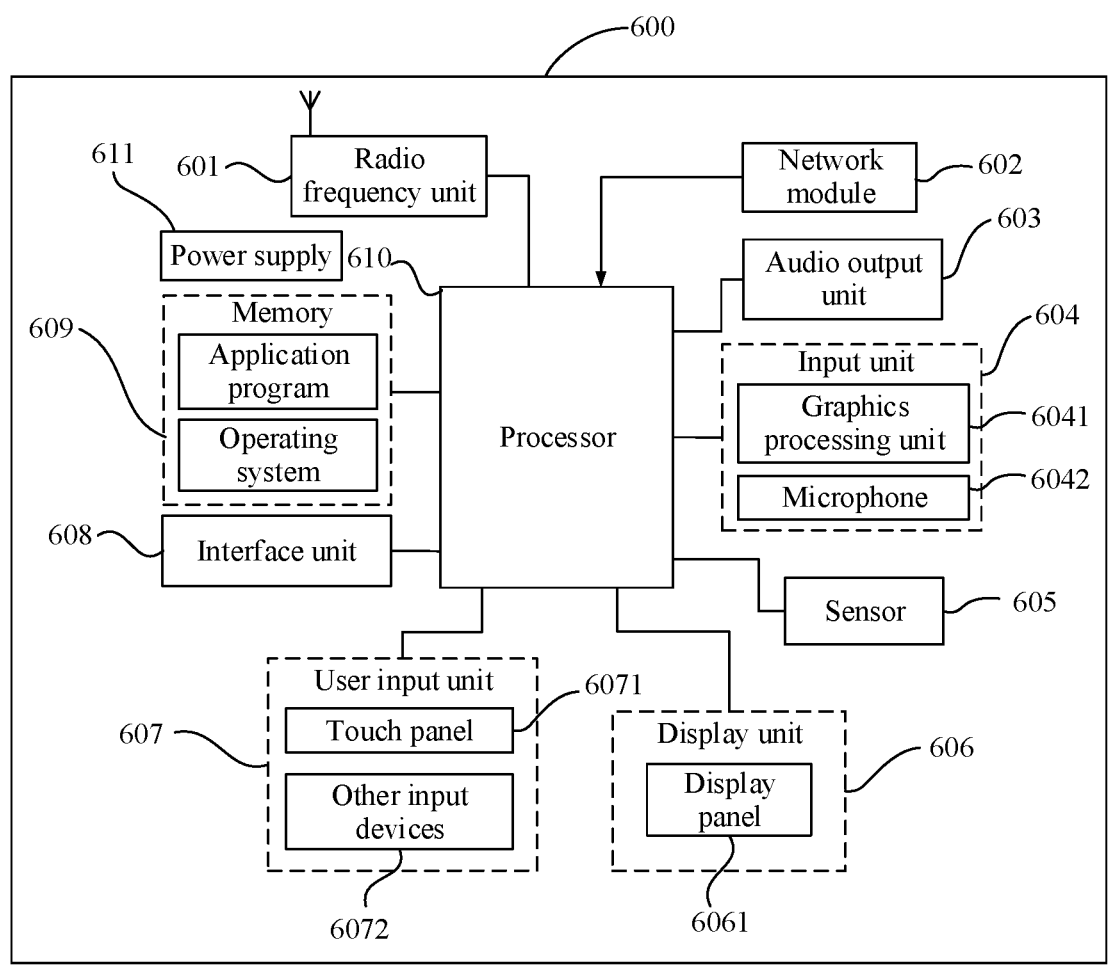
FIG. 6 is a structural block diagram of a terminal according to an embodiment of the present application.

FIG. 6 is a schematic diagram of a hardware structure of an electronic device for implementing each embodiment of the present application.

The electronic device may be a terminal. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of the present application, the terminal includes but is not limited to a mobile phone, a tablet computer, a notebook computer, a palmtop computer, or the like.

The processor 610 may be configured to perform various operations. For example, in a case that a first electronic device is electrically connected to a second electronic device by using a connection cable, a reverse charging instruction is obtained, where the reverse charging instruction indicates a charging mode of reverse charging. For example, based on the charging mode indicated by the reverse charging instruction, by controlling a target control module of the first electronic device, a potential on a first pin of a positive data lead in the connection cable and a potential on a second pin of a negative data lead in the connection cable are adjusted. For example, based on the potential on the first pin and the potential on the second pin, the first electronic device is controlled to reversely charge the second electronic device.

It should be understood that in this embodiment of the present application, the radio frequency unit 601 may be configured to receive and send signals in an information reception or transmission or call process. Specifically, after receiving downlink data from a base station, the radio frequency unit 601 sends the downlink data to the processor 610 for processing, and in addition, sends uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide an audio output (for example, a call signal received sound or a message received sound) related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or be sent by the radio frequency unit 601 or the network module 602. The microphone 6042 is capable of receiving sounds and processing such sounds into audio data. The processed audio data can be converted into a format that can be sent to a mobile communication base station through the radio frequency unit 601 in a telephone call mode, for outputting.

The terminal 600 may further include at least one sensor 605, for example, an optical sensor, a motion sensor, and another sensor. Specifically, the optical sensor includes an ambient light sensor and a proximity sensor. The ambient light sensor may adjust luminance of a display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the terminal is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information and generate a key signal input related to user setting and function control of the terminal. Specifically, the user input unit 607 includes a touch panel 6071 and other input devices 6072. The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch azimuth of the user, detects a signal brought by a touch operation, and transmits the signal to the touch controller. The touch controller receives touch information from the touch detection apparatus, converts the touch information into touchpoint coordinates, and sends the touchpoint coordinates to the processor 610, and receives a command sent by the processor 610 and executes the command. In addition, the touch panel 6071 may be implemented in a plurality of forms, for example, as a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal 600, or may be configured to transmit data between the terminal 600 and the external apparatus.

The memory 609 may be configured to store software programs and various data. The memory 609 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory such as at least one disk storage device, a flash memory device, or another volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Preferably, the processor 610 may integrate an application processor and a modem processor. The application processor mainly processes the operating system, a user interface, an application program, and the like. The modem processor mainly processes wireless communication. It may be understood that the modem processor may alternatively be not integrated in the processor 610.

The terminal 600 may further include the power supply 611 (such as a battery) supplying power to each component. Preferably, the power supply 611 may be logically connected to the processor 610 by using a power management system, so that functions such as charge and discharge management and power consumption management are implemented by using the power management system.

In addition, the terminal 600 includes some functional modules that are not shown. Details are not described herein.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present application.

The embodiments of the present application are described above with reference to the accompanying drawings, but the present application is not limited to the embodiments. The embodiments are only illustrative rather than restrictive. Inspired by the present application, a person of ordinary skill in the art can still derive a plurality of variations without departing from the essence of the present application and the protection scope of the claims. All these variations shall fall within the protection of the present application.

What is claimed is:

1. An electronic device, comprising a first switch module, a first electrical connection terminal, a second electrical connection terminal, and a control module, wherein
the first switch module is electrically connected between the first electrical connection terminal and the second electrical connection terminal, the first electrical connection terminal is configured to electrically connect to a third electrical connection terminal of a second electronic device, and the second electrical connection terminal is configured to electrically connect to a fourth electrical connection terminal of the second electronic device;
the control module is connected to the first switch module to control the first switch module to switch between an on state and an off state; and
when the first switch module is in the on state, the electronic device outputs a first current; or
when the first switch module is in the off state, the electronic device outputs a second current;
wherein the electronic device further comprises a first power supply, a second power supply, a second switch module, and a third switch module, and the control module is connected to the second switch module and the third switch module respectively;
the first power supply is connected to the first electrical connection terminal, and the second power supply is connected to the second electrical connection terminal;
a first end of the second switch module is electrically connected to the first power supply, and a second end of the second switch module is electrically connected to the first electrical connection terminal; and
a first end of the third switch module is electrically connected to the second power supply, and a second end of the third switch module is electrically connected to the second electrical connection terminal.

2. The electronic device according to claim 1, wherein the first power supply is a voltage-adjustable power supply, and/or the second power supply is a voltage-adjustable power supply.

3. The electronic device according to claim 1, wherein the electronic device further comprises a fourth switch module and a fifth switch module, wherein the control module is connected to the fourth switch module and the fifth switch module respectively; and a first end of the fourth switch module is electrically connected to the first electrical connection terminal, a second end of the fourth switch module is grounded, a first end of the fifth switch module is electrically connected to the second electrical connection terminal, and a second end of the fifth switch module is grounded.

4. The electronic device according to claim 3, wherein in a case that the electronic device is in a second charging mode, the first switch module, the second switch module, and the third switch module are all in the off state, and the fourth switch module and the fifth switch module are both in the on state.

5. The electronic device according to claim 3, wherein in a case that the electronic device is in a fifth charging mode, the first switch module is in the off state, and the second switch module, the third switch module, the fourth switch module, and the fifth switch module are all in the on state.

6. The electronic device according to claim 3, wherein the fourth switch module comprises a third switch element and a third resistor connected in series to the third switch element, and the fifth switch module comprises a fourth switch element and a fourth resistor connected in series to the fourth switch element;

the third switch element is electrically connected to the first electrical connection terminal, and the third resistor is grounded; or the third switch element is grounded, and the third resistor is electrically connected to the first electrical connection terminal; and the fourth switch element is electrically connected to the second electrical connection terminal, and the fourth resistor is grounded; or the fourth switch element is grounded, and the fourth resistor is electrically connected to the second electrical connection terminal.

7. The electronic device according to claim 1, wherein in a case that the electronic device is in a first charging mode, the first switch module, the second switch module, and the third switch module are all in the off state.

8. The electronic device according to claim 1, wherein in a case that the electronic device is in a third charging mode, the first switch module is in the on state, and the second switch module and the third switch module are both in the off state.

9. The electronic device according to claim 1, wherein in a case that the electronic device is in a fourth charging mode, the first switch module is in the off state, and the second switch module and the third switch module are both in the on state.

10. The electronic device according to claim 1, wherein the second switch module comprises a first switch element and a first resistor connected in series to the first switch element, and the third switch module comprises a second switch element and a second resistor connected in series to the second switch element;

the first switch element is electrically connected to the first electrical connection terminal, and the first resistor is electrically connected to the first power supply; or the first switch element is electrically connected to the first power supply, and the first resistor is electrically connected to the first electrical connection terminal; and the second switch element is electrically connected to the second electrical connection terminal, and the second resistor is electrically connected to the second power supply; or the second switch element is electrically connected to the second power supply, and the second resistor is electrically connected to the second electrical connection terminal.

\* \* \* \* \*